United States Patent [19]

Ako

[11] Patent Number: 5,025,199
[45] Date of Patent: Jun. 18, 1991

[54] SERVO CONTROL APPARATUS

[75] Inventor: Hidenobu Ako, Ogaki, Japan

[73] Assignee: Teijin Seiki Company Limited, Osaka, Japan

[21] Appl. No.: 392,892

[22] Filed: Aug. 14, 1989

[30] Foreign Application Priority Data

Aug. 23, 1988 [JP] Japan .................................. 63-209757

[51] Int. Cl.$^5$ ............................................. G05B 13/00
[52] U.S. Cl. ..................... 318/561; 318/590; 318/611; 318/626; 318/563; 244/175; 244/194; 91/35; 60/413; 137/625.69
[58] Field of Search ............... 318/561, 590, 611, 626, 318/563, 621, 566, 580; 244/175, 194, 195, 233; 91/35; 60/413; 137/625.69

[56] References Cited

U.S. PATENT DOCUMENTS

| 4,546,426 | 10/1985 | Häfner et al. ............. 318/561 X |
| 4,596,177 | 6/1986 | Biafore ............................ 91/35 |
| 4,612,489 | 9/1986 | Gunda ............................ 318/590 |
| 4,630,441 | 12/1986 | Chamberlain ................... 60/413 |
| 4,671,166 | 6/1987 | Glaze et al. ..................... 91/361 |
| 4,827,981 | 5/1989 | Livecchi et al. ............ 137/625.69 |

Primary Examiner—William M. Shoop, Jr.
Assistant Examiner—Saul M. Bergmann
Attorney, Agent, or Firm—Lane, Aitken & McCann

[57] ABSTRACT

A servo control apparatus comprising: a unit for generating a required position value; an actuator adapted to drive a load and having its maximum displacement in one direction and its minimum displacement in the other direction; a drive unit for driving the actuator; a position detecting unit for detecting a displacement of the actuator; and a control unit for correcting the required position value on basis of the maximum and minimum displacements of the actuator and for computing a deviation between an output of the position detecting unit and the corrected required position value; the load being controlled by the deviation.

8 Claims, 5 Drawing Sheets

SERVO CONTROL APPARATUS

FIELD OF THE INVENTION

The present invention relates in general to servo control apparatuses, and in particular to such apparatuses wherein an accuracy of control in the electro hydraulic servo system (hereinafter referred to as a servo system) used therein is enhanced with simpler construction.

DESCRIPTION OF THE PRIOR ART

Typically, a servomechanism is constructed so as to control the position, heading, attitude or the like of an object by the deviation (error) between a set target and the actual response. The servomechanism is employed in various controls such as a position or attitude control of ships, aircraft and space satellites, a tool position control of machine tools and the like. Such a servomechanism is normally operated at relatively high speeds, and a high accuracy of control is therefore required in the actuation of the servomechanism.

FIG. 6 shows a conventional servo control apparatus applied to the servomechanism of the above type. The control apparatus shown in FIG. 6 constitutes an electro hydraulic servo loop. In FIG. 6, the hydraulic pressure of a hydraulic source 1 is supplied through a hydraulic servo valve 2 to a hydraulic actuator 3, which is adapted to drive a control surface (rudder, elevator, ailerons, flaps of aircraft) or load 4 in response to the rate of flow controlled by the hydraulic servo valve 2. The servo valve 2 is an electro-hydraulic converter which is capable of controlling a hydraulic power corresponding to several horsepowers to several tens of horsepowers by the aid of a very small electric input, i.e. electric signal of, for example, several milliwatts. The hydraulic actuator 3 is preferable to have a quick response. The control surface 4 is adapted to control an attitude of aircraft and rotates about a fulcrum 4a in the directions indicated by the arrow in FIG. 6, and a rotational angle $\theta$ of the control surface 4 thus changes.

The position of the piston 3a of the hydraulic actuator 3 is detected by a position detector 5 comprising a LVDT (Linear Variable Differential Transducer), which position detector 5 converts the detected piston position into an electric signal and outputs the signal to a demodulator 6. The demodulator 6 has a filter part for removing noise components of the output signal of the position detector 5, and demodulates the output signal to the same circuit signal of the control system and outputs it to an A/D (analog/digital) converter 7. The A/D converter 7 converts the analog signal from the demodulator 6 into a digital signal. The A/D converter 7 is connected through a bus line 8 to a memory 9, a CPU (central processing unit) 10, a remote terminal (RT) circuit 11 and to a D/A (digital/analog) converter 12. The remote terminal circuit 11 receives a required position value that corresponds to a control command of the rotational angle $\theta$ of the control surface 4 outputted from a flight computer (not shown), and for example, a signal from a cockpit is transmitted through a signal transmission system, this signal is converted into a digital signal through a modem and transmitted t the bus line 8 by the remote terminal circuit 11.

The CPU 10 computes the deviation between the required position value converted into the digital signal and the output of the demodulator 6 converted into the digital signal, in accordance with a program stored in the memory 9. The deviation computed by the CPU 10 is converted into an analog signal by the D/A converter 12, and the analog signal is inputted to an amplifier 13. The amplifier 13 amplifies the analog output from the D/A converter 12 and supplies the amplified output to the hydraulic servo valve 2. The hydraulic servo valve 2 generates a hydraulic power in response to the current signal supplied from the amplifier 13. In this way, the electro-hydraulic servo control of the servo control apparatus as shown in FIG. 6 is achieved.

However, in the conventional servo control apparatus described above, the accuracy of control could not be increased because errors occur in the actual outputs of the position detector 5, demodulator 6 and A/D converter 7 due to the gain errors or null bias in the position detector 5, demodulator 6 and A/D converter 7. Therefore, if a control value of the servo loop of the apparatus is obtained on the basis of the deviation between the required position value and the output of the position detector 5 including the errors, the control value will include errors and be not able to control the control surface 4 with high accuracy. As a result, the accuracy of control of the servo control apparatus is reduced.

Reducing the aforesaid errors to a minimum level is most important for the flight control of aircraft which requires a high degree of accuracy. In order to reduce the errors to a minimum level, electronic components of high accuracy can be employed in the position detector 5, demodulator 6 and the like. However, this results in a rise in production cost and an increase in weight. Furthermore, since the actuators (hydraulic actuator 3, position detector 5, etc.) and the control electronic units (demodulator 6, A/D converter 7, CPU 10, etc.) are normally supplied and disposed individually, the matching between the actuators and the control electronic units paired with the actuators cannot be made with high accuracy. As a result, the matching of high accuracy is needed.

It is accordingly an object of the present invention to provide a novel servo control apparatus which is capable of increasing an accuracy of control, without a rise in production cost and an increase in weight.

It is a further object of the invention to provide a novel servo control apparatus wherein the matching between the actuators and the control electronic units is made with high accuracy.

SUMMARY OF THE INVENTION

In accordance with one important aspect of the present invention, there is provided a servo control apparatus comprising: means for generating a required position value; an actuator adapted to drive a load and having its maximum displacement in one direction and its minimum displacement in the other direction; drive means for driving the actuator; position detecting means for detecting a displacement of the actuator; and control means for correcting the required position value on basis of the maximum and minimum displacements of the actuator and for computing a deviation between an output of the position detecting means and the corrected required position value; the load being controlled by the deviation.

The servo control apparatus may further comprise store means for storing an output of the position detecting means when the actuator is moved to the maximum displacement, as a maximum displacement and for storing an output of the position detecting means when the actuator is moved to the minimum displacement, as a minimum displacement. The servo control apparatus may also further comprise a demodulator connected to the position detecting means, analog/digital converter connected to the demodulator and for converting an output of the demodulator into a digital signal, a remote terminal circuit for converting the required position value into a digital signal, and a digital/analog converter for converting the deviation computed by the control means into an analog signal and connected to the drive means. The analog/digital converter, the store means, the control means, the remote terminal circuit and the digital/analog converter are connected with each other.

The load may comprise a control surface of aircraft.

In accordance with another important aspect of the present invention, there is provided a servo control apparatus comprising: means for generating a required position value; an actuator adapted to drive a load and having its maximum displacement in one direction and its minimum displacement in the other direction; drive means for driving the actuator; position detecting means for detecting a displacement of the actuator; and control means for correcting an output of the position detecting means on basis of the maximum and minimum displacements of the actuator and for computing a deviation between the corrected output of the position detecting means and the required position value; the load being controlled by the deviation.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
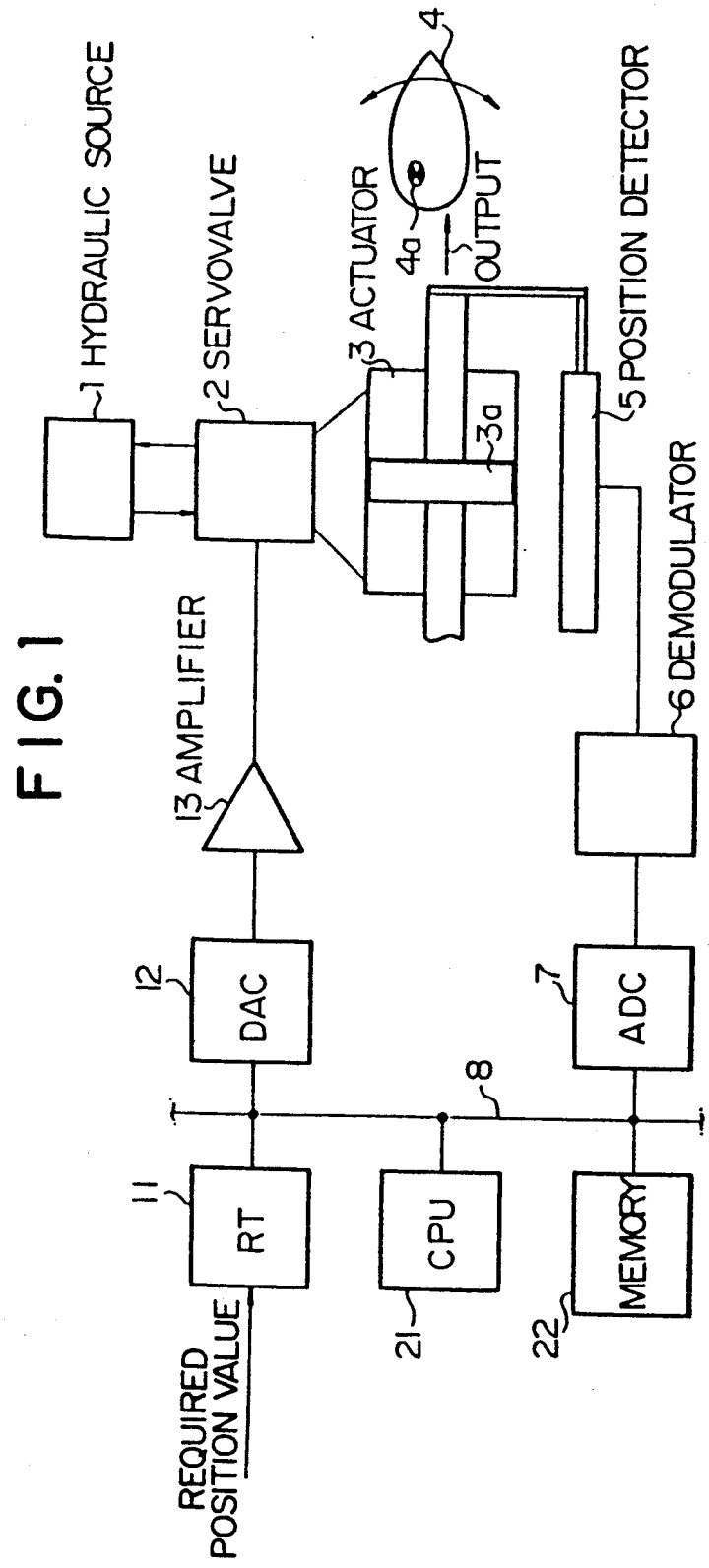
FIG. 1 is a block diagram showing an embodiment of a servo control apparatus according to the present invention.

Referring to FIGS. 1 through 4, there is shown a preferred embodiment of a servo control apparatus according to the present invention. As in the case of the conventional servo control apparatus shown in FIG. 6, this embodiment is applied to the flight control of aircraft. The actuators and control electronic units substantially identical to those of FIG. 6 are designated by like reference numerals for avoiding the description.

Figure 6:
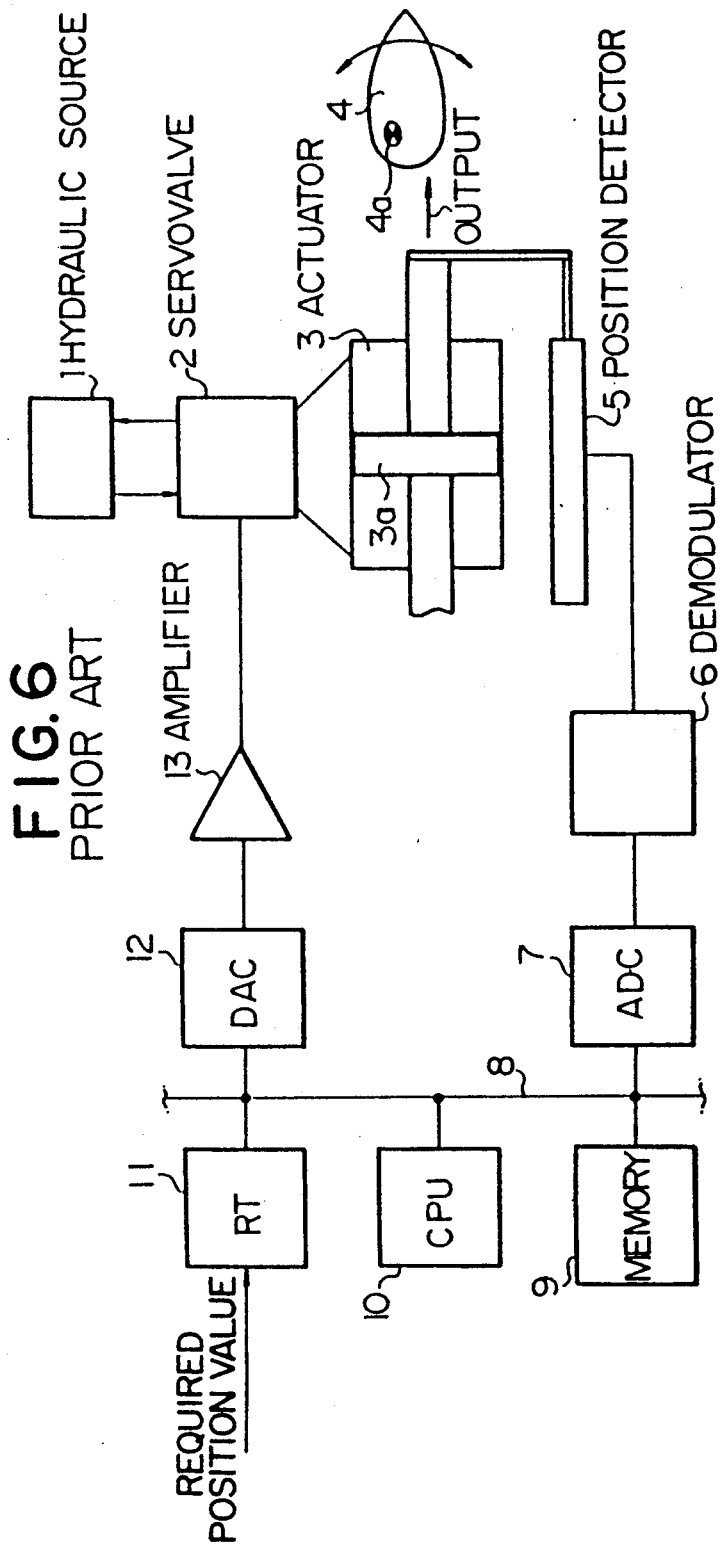
FIG. 6 is a block diagram showing a conventional servo control apparatus.

In FIG. 1, a CPU (central processing unit) 21 and a memory 22 are different in function from those of the conventional control apparatus shown in FIG. 6. That is, unlike the CPU 10 of the conventional control apparatus shown in FIG. 6, the CPU 21 has control means and correction means, and moves the piston 3a of the hydraulic actuator 3 to its maximum positions in the opposite directions of the actuator 3, and the outputs of the position detector 5 in these maximum positions are stored as a maximum displacement and a minimum displacement in the memory 22. On the basis of these maximum and minimum displacements, the CPU 21 corrects a required position value, and computes a control value, which controls the control surface 4, with the corrected control required position value. Also, the memory 22 has a program different from that of the conventional memory 9 of FIG. 6, and in accordance with this program, the CPU 21 computes a processing value necessary for servo control. The position detector 5 comprises a LVDT (Linear Variable Differential Transducer) and constitutes detecting means.

The operation of the servo control apparatus of the present invention will hereinafter be described in detail.

In order to offset gain errors and null bias in the servo loop of the servo control apparatus, in the embodiment of the present invention, instead of using a required position value as it is, the required position value is corrected by the computation of the CPU 21. A constant used in that computation is obtained in accordance with the program of FIG. 2, using the end stroke positions of the piston 3a of the hydraulic actuator 3. On the basis of this constant, the required position value is corrected, and the deviation between the corrected required position value and the feedback value (demodulator output) is computed, as shown in the program of FIG. 3.

Figure 2:
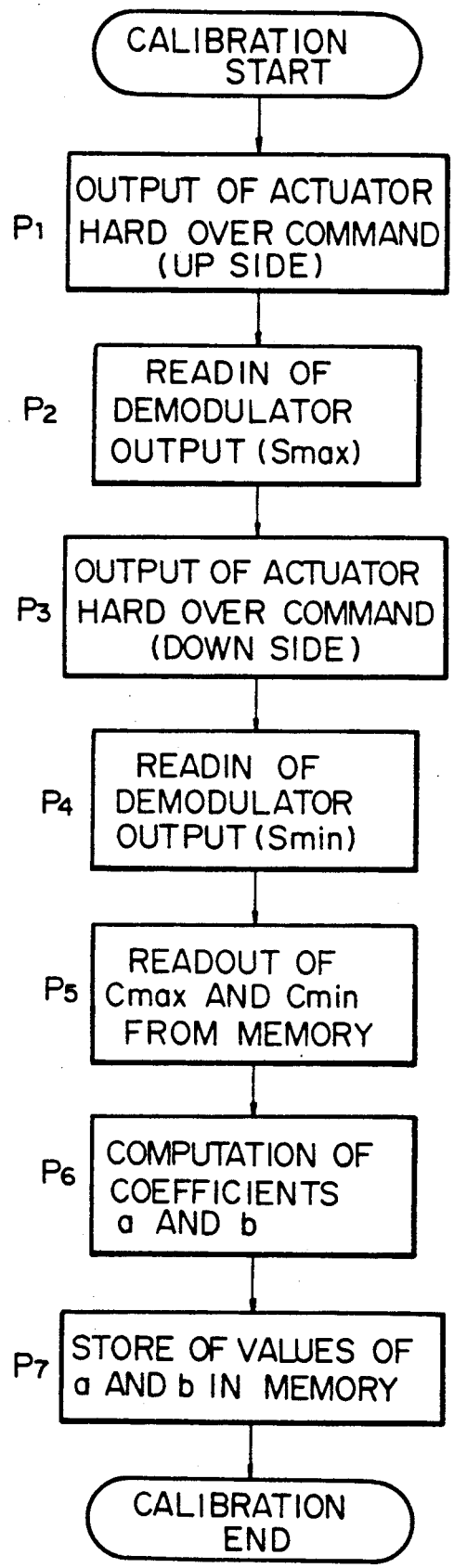
FIG. 2 is a flow chart showing a calibration program used in the CPU (central processing unit) of FIG. 1.
Figure 3:
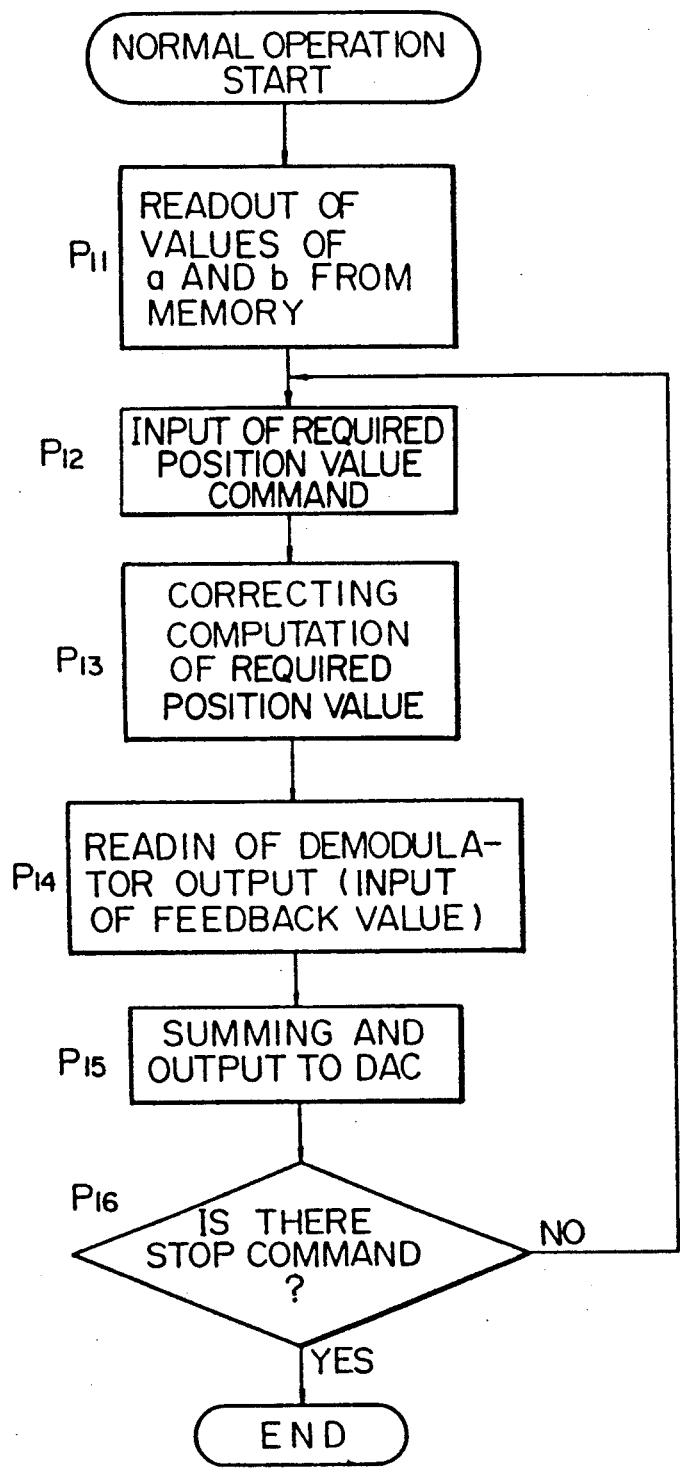
FIG. 3 is a flow chart showing a program for computing a control value with which the load of FIG. 1 is servo controlled.

In FIG. 2, a calibration (corresponding to the aforesaid correction) will start by a calibration start signal. When the calibration starts, in process P1, an actuator hard over command is first outputted to the servo loop of the servo control apparatus. By this command, the control surface 4 is moved toward its up side into its maximum position which corresponds to the so-called bottom coupling position of the actuator 3 and to the maximum rotational angle of the control surface 4 in the up direction. Next, in process P2, the output of the demodulator 6 at the time the piston 3a of the actuator 3 is coupled to the bottom in the up side, is read as Smax. Likewise, in process P3, an actuator hard over command is outputted which corresponds to the maximum rotational angle of the control surface 4 in the down direction, and in process P4, the output of the demodulator 6 at that time is read as Smin. In process P5, the maximum value Cmax and minimum value Cmin of the required position value are read out from the memory 22. The maximum value Cmax and minimum value Cmin correspond to the up-direction maximum angle and down-direction maximum angle, respectively, and with respect to the hydraulic actuator 3, correspond to the end stroke positions of the piston 3a in the opposite directions. In process P6, coefficients a and b are computed by the following equations:

$$S = a \cdot C + b \quad (1)$$

$$a = (Smax - Smin)/(Cmax - Cmin) \quad (2)$$

$$b = (Smin \cdot Cmax - Smax \cdot Cmin)/(Cmax - Cmin) \quad (3)$$

where S indicates a feedback signal of a servo loop including null bias and gain errors, and C a required position value. The coefficients a and b are coefficients of a linear equation passing through two points (Cmax, Smax) and (Cmin, Smin), and are parameters which represent the actual operating state of the hydraulic actuator 3 with respect to the required position value. In process P7, the values of the coefficients a and b are stored in the memory 22, and then the calibration is complete.

Next, in the program of the normal operating mode as shown in FIG. 3, the coefficients a and b are read out from the memory 22 at process P11, and a control target command is inputted at process P12. In process P13, the correcting calculation of the required position value is made in accordance with the following equation:

$$C' = a \cdot C + b \quad (4)$$

where C' denotes a correction value of a required position. By the equation (4), the required position value C is corrected on the basis of the coefficients a and b, and if the equation (4) is compared with the equation (1), the C' will be equal to the S. This means that the correction was made to correspond the servo command with the feedback value including errors. In process P14, the output of the demodulator 6 (input (f) of the feedback value) is read, and added to the correction value C' at process P15 (that is, the processing value ($=a \cdot C + b - f$) of the servo control is computed from the deviation between the output (f) of the demodulator 6 and the correction value C' which is $a \cdot C + b$). The result $aC + b$ of the computation is inputted to the D/A converter 12, and the hydraulic actuator 3 is driven through the amplifier 13 and the hydraulic servo valve 2. Consequently, the control surface 4 changes so as to follow the required position value. Thereafter, in process P16, it is determined whether or not there is a stop command regarding a normal operation, and if there is not the stop command, the process P16 is returned to the process P12 to repeat the servo loop, and if there is the stop command, the program is complete.

Figure 4:
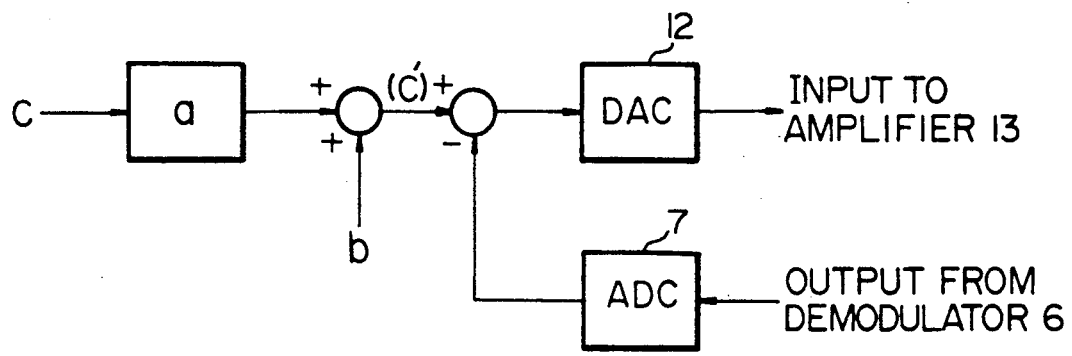
FIG. 4 is an enlarged block diagram showing schematically a computation process for obtaining the control value.

Thus, in the embodiment of the present invention, the actual operating state of the hydraulic actuator 3 is first calibrated with respect to the required position value, on the basis of the end stroke positions of the piston 3a of the hydraulic actuator 3, and in the normal operating mode which is in flight, the servo command is corrected to match with the feedback value including errors. The processing method of the calibration and correction is shown in FIG. 4. The CPU 21 corrects the required position value C to C' on the basis of the coefficients a and b, and thereafter the output from the demodulator 6 is added to the corrected value C', and the sum is inputted to the D/A converter 12. As a result, the actual action of the piston 3a of the hydraulic actuator 3 matches with the required position value, and the gain errors and the errors caused by the null bias can be eliminated.

It is noted that, in practice, there are nonlinear errors other than gain errors and null bias errors and the correction to these errors is not always effectively made by the aforementioned linear equation. However, since the nonlinearity of the components in the actuator servo loop of the type, which is used in the conventional apparatus and the apparatus of the present invention, is very small as compared with the gain errors and null bias errors, there would be no problems from the viewpoint of control, even if the nonlinear errors remain as they are.

Also, in the present invention, the need for electronic components of high accuracy to remove errors is eliminated. Since the computing method of the CPU 21 and data processing method of the memory 22 are merely improved, a rise in cost is very small and there is no increase in weight. An actuator servo loop of less expensive and higher accuracy can be consequently obtained.

Hence, if economical components (which are not made with the greater degree of accuracy) are employed in the actuator servo loop, errors will become large. However, the accuracy of the end stroke positions of the piston 3a of the actuator 3 can be easily obtained. Therefore, in the present invention, by ensuring the accuracy of the end stroke positions of the piston 3a, an algorithm to eliminate errors is achieved with low cost on the basis of data of high accuracy.

Next, the matching between the hydraulic actuator 3 and the control electronic units will hereinafter be explained.

As in the conventional control apparatus of FIG. 6, also in the present invention, the control electronic units are supplied individually. But, in the present invention, for example, the control surface 4 is periodically moved to the end stroke positions of the piston 3a of the actuator 3 before flight, and the respective end stroke positions are set as reference positions to match with a maximum value of a required position value. In this case, the hydraulic actuator 3 has a high dimension accuracy of the end stroke positions of the piston 3a, and the high dimension accuracy on the order of several tens of microns can be normally obtained with an economic machining method. On the other hand, since the deviation of the electronic components of the servo loop caused by the gain errors and null bias is more than 1% of the full scale, an error of more than 1 mm will occur, for example, in the case that the stroke of the actuator 3 is more than 100 mm. Since in the present invention the required position value is corrected on the basis of the end stroke positions of the piston 3a of the actuator 3 having a high accuracy of dimension, the matching between the actuator 3 and the control electronic units is automatically made by this correction. Consequently, the matching can be made with extreme ease and high accuracy.

Figure 5:
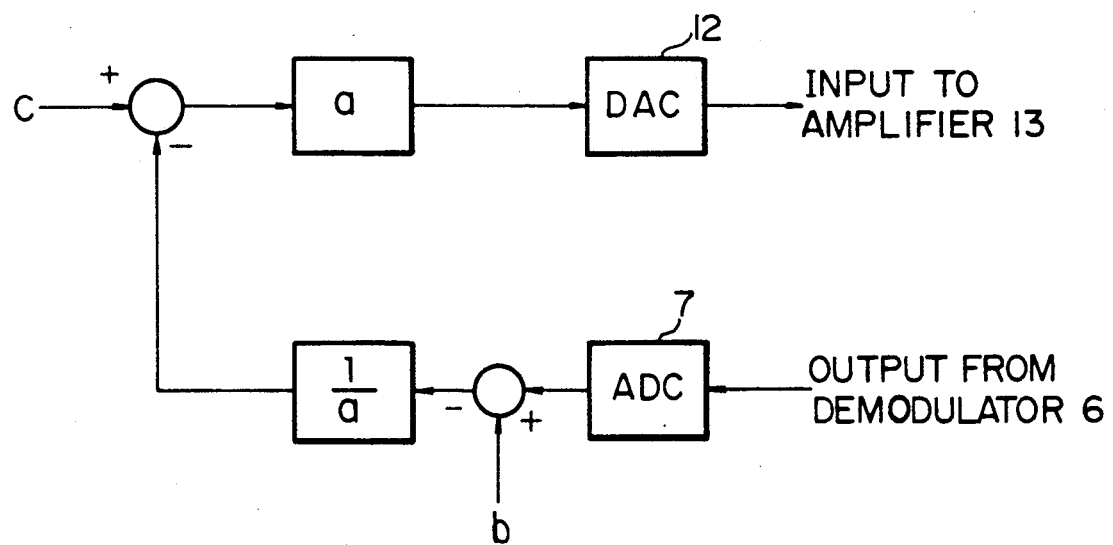
FIG. 5 is a diagram similar to FIG. 4 but showing another computation process for obtaining the control value.

While in the aforesaid embodiment the required position value is corrected, the present invention is not limited to this embodiment but can also obtain the same effect, in the case that, as shown in FIG. 5, the output of the demodulator 6 is corrected. That is, in FIG. 5, the CPU 21 subtracts the coefficient b from the output (f) of the demodulator 6, multiplies the resultant by 1/a (i.e., $(f-b) \cdot 1/a$), and adds it to the required position value C. Thereafter, the sum is multiplied by a, (i.e., $a(C-(f-b) \cdot 1/a) = a \cdot C + b - f$) and the resultant $(a \cdot C + b - F)$ (i.e., $C - (f-b) \cdot 1/a$) is the same as that $(a \cdot C + b - f)$ of the FIG. 4 embodiment and is outputted to the D/A converter 12. Thus, even if the output of the demodulator is corrected, the same effect as the embodiment of FIG. 4 can be obtained.

While the aforementioned embodiments are applied to the flight control of aircraft, the present invention is also applicable to other servo control apparatuses.

What I claim is:

1. A servo control apparatus comprising:
   means for generating a required position value;
   an actuator adapted to drive a load and having its maximum displacements in one direction and its minimum displacement in the other direction;
   drive means for driving said actuator;

position detecting means for detecting a displacement of said actuator; and control means for correcting said required position value on basis of said maximum and minimum displacements of said actuator and for computing a deviation between an output of said position detecting means and said corrected required position value;

said load being controlled by said deviation.

2. A servo control apparatus comprising:

means for generating a required position value;

an actuator adapted to drive a load and having its maximum displacements in one direction and its minimum displacement in the other direction;

drive means for driving said actuator;

position detecting means for detecting a displacement of said actuator; and control means for correcting an output of said position detecting means on basis of said maximum and minimum displacements of said actuator and for computing a deviation between said corrected output of said position detecting means and said required position value;

said load being controlled by said deviation.

3. A servo control apparatus as set forth in claim 1, which further comprises store means for storing an output of said position detecting means when said actuator is moved to said maximum displacement, as a maximum displacement and for storing an output of said position detecting means when said actuator is moved to said minimum displacement, as a minimum displacement.

4. A servo control apparatus as set forth in claim 2, which further comprises store means for storing an output of said position detecting means when said actuator is moved to said maximum displacement, as a maximum displacement and for storing an output of said position detecting means when said actuator is moved to said minimum displacement, as a minimum displacement.

5. A servo control apparatus as set forth in claim 3, which further comprises a demodulator connected to said position detecting means, an analog/digital converter connected to said demodulator and for converting an output of said demodulator into a digital signal, a remote terminal circuit for converting said required position value into a digital signal, and a digital/analog converter for converting said deviation computed by said control means into an analog signal and connected to said drive means, and wherein said analog/digital converter, said store means, said control means, said remote terminal circuit and said digital/analog converter are connected with each other.

6. A servo control apparatus as set forth in claim 4, which further comprises a demodulator connected to said position detecting means, an analog/digital converter connected to said demodulator and for converting an output of said demodulator into a digital signal, a remote terminal circuit for converting said required position value into a digital signal, and a digital/analog converter for converting said deviation computed by said control means into an analog signal and connected to said drive means, and wherein said analog/digital converter, said store means, said control means, said remote terminal circuit and said digital/analog converter are connected with each other.

7. A servo control apparatus as set forth in claim 1, in which said load comprises a control surface of aircraft.

8. A servo control apparatus as set forth in claim 2, in which said load comprises a control surface of aircraft.

* * * * *